United States Patent
Hellmich et al.

(10) Patent No.: US 7,186,195 B2
(45) Date of Patent: Mar. 6, 2007

(54) CHAIN-TENSIONER WITH MECHANICAL LOCKING

(75) Inventors: Wolfram Hellmich, Munich (DE); Volker Hirschmann, Furstenfeldbruck (DE)

(73) Assignee: Joh. Winklhofer & Sohne GmbH und. Co. KG, Munich (DE)

( * ) Notice: Subject to any disclaimer, the term of this patent is extended or adjusted under 35 U.S.C. 154(b) by 392 days.

(21) Appl. No.: 10/450,725

(22) PCT Filed: Sep. 3, 2002

(86) PCT No.: PCT/EP02/09849

§ 371 (c)(1),
(2), (4) Date: Nov. 7, 2003

(87) PCT Pub. No.: WO03/046411

PCT Pub. Date: Jun. 5, 2003

(65) Prior Publication Data

US 2004/0067805 A1    Apr. 8, 2004

(30) Foreign Application Priority Data

Nov. 27, 2001 (DE) .......................... 201 19 200 U

(51) Int. Cl.
*F16H 7/08* (2006.01)
(52) U.S. Cl. .................. 474/110; 474/109; 474/101
(58) Field of Classification Search ............. 474/101, 474/138, 109–112, 113–117, 133–135
See application file for complete search history.

(56) References Cited

U.S. PATENT DOCUMENTS

| | | | | |
|---|---|---|---|---|
| 5,004,448 A | * | 4/1991 | Ojima | 474/111 |
| 5,649,878 A | * | 7/1997 | Noguchi et al. | 474/110 |
| 5,911,641 A | * | 6/1999 | Sheren et al. | 474/109 |
| 5,989,139 A | * | 11/1999 | Dusinberre et al. | 474/110 |
| 6,244,981 B1 | * | 6/2001 | Simpson | 474/110 |

FOREIGN PATENT DOCUMENTS

| | | | | |
|---|---|---|---|---|
| DE | 3741860 A1 | | 6/1989 | |
| DE | 10014700 A1 | * | 10/2001 | |
| EP | 0657662 A2 | | 6/1995 | |
| JP | 60-156201 | | 10/1985 | |
| JP | 63-154850 | | 10/1988 | |
| JP | 05071603 A1 | | 3/1993 | |
| JP | 5-86057 | | 11/1993 | |
| JP | 06-94089 A | * | 4/1994 | 474/110 |
| JP | 7-208566 | | 8/1995 | |
| JP | 08-184354 A | * | 7/1996 | 474/110 |
| WO | WO 00/61969 A1 | | 10/2000 | |

* cited by examiner

Primary Examiner—Marcus Charles
(74) Attorney, Agent, or Firm—Marshall, Gerstein & Borun LLP

(57) ABSTRACT

A tensioner for endless driving elements, such as chains and belts, comprising a tensioning piston provided with locking means, and a locking piston which is adapted to be engaged with and disengaged from the locking means so as to arrest or release the movement of tensioning piston, the locking piston comprising an operating section causing locking piston to move to the arresting position and to the release position, and a locking area used for engagement with the locking means of the tensioning piston and arranged separately from the operating section.

9 Claims, 2 Drawing Sheets

CHAIN-TENSIONER WITH MECHANICAL LOCKING

FIELD OF THE INVENTION

The present invention relates to a tensioner for endless driving elements, such as chains and belts, and particularly a tensioner having a tensioning piston provided with locking means, and a locking piston which is implemented such that it is adapted to be engaged with and disengaged from the locking means so as to arrest or release the movement of the tensioning piston.

BACKGROUND OF THE INVENTION

Such a tensioner is known e.g. from EP 0 657 662 A 2. This chain tensioner comprises a tensioning piston having a plurality of locking grooves on the outer circumference thereof, the locking grooves being engaged by a spring-loaded locking piston. The front face of the locking piston is beveled and can be acted upon by an oil pressure so as to disengage the locking position. The locking means guarantees that a locking effect is produced when the engine oil hydraulic system is switched off and that the locking piston can no longer retract. This has the effect that a certain pretension is maintained, even if the engine is at rest, in spite of possible oil leakage from the pressure chamber. Hence, a predetermined tension, which is independent of the engine oil hydraulic system, will exist when the engine is started. As soon as sufficient pressure has built up, the locking means will be disengaged and the tensioning piston will operate in the usual way.

A similar tensioner is known e.g. from DE 195 48 923 A1. In addition, conventional locking devices are provided on chain tensioners and the like, but these locking devices only serve to carry out a readjustment and to limit the retraction path of the tensioning piston to a pre-determined value. Such structural designs are used for wear compensation. Locking de-vices connected to the engine oil hydraulic system are disadvantageous insofar as they are subjected to the fluctuations of the hydraulic pressure and to a possible pressure build-up in the area of the tensioning piston. In the case of conventional locking devices, the locking piston is forced back by the teeth on the tensioning piston against the force of a spring, and this will entail wear.

It is therefore the object of the present invention to improve the structural design of a tensioner of the type used with chaims and belts.

In accordance with the present invention, this object is achieved by the features that the locking piston comprises an operating section causing said locking piston to move to the arresting position and to the release position, and a locking area used for engagement with the locking means of the tensioning piston and arranged separately from the operating section. Due to the fact that the operating point of the locking piston and the point of engagement are separated from one another, it is no longer necessary that the locking area is acted upon by operating forces so as to disengage the locking piston. In the case of hydraulically operated tensioners this means e.g. that the locking area of the locking piston need no longer be exposed directly to the engine oil hydraulic pressure. Actuation in one direction (arresting position) as well as in the other direction (release position) takes place at some other point. A great variety of operating mechanisms for achieving a piston movement can be employed. This separation of the locking function and of the operating function also permits the locking piston to be controlled in a purposeful manner in dependence upon the operating parameters. Conventional locking devices of the readjustment type as well as locking devices which are readjustable by an engine oil hydraulic system are always provided with operating means acting directly on the locking area.

According to an advantageous embodiment, the operating section of the locking piston can be provided with a piston area which is adapted to have applied thereto an operating pressure of a hydraulic fluid, the operating direction of the piston area being directed towards the release position of the locking piston. This measure has the effect that the locking piston will be displaced to the release position in response to application of a hydraulic pressure. Such a structural design could be used in internal combustion engines and connected to the engine oil hydraulic system.

In accordance with a preferred embodiment, a spring means can be provided, which acts on the operating area of the locking piston and which is effective in the direction of the arresting position of the locking piston. This measure has the effect that the locking piston is primarily forced into the arresting position by the spring force of the spring means. This means that an operating force in the opposite direction must always be larger so as to cause unlocking.

According to an advantageous embodiment, the locking area of the locking piston can be designed such that a hydraulic force balance is caused. Such a structural design allows the locking area of the locking piston to be subjected to a pressure medium, without the pressure medium causing any essential force component on the locking area for operating the locking piston. A person skilled in the art knows that, in order to achieve this, he must cause forces to act in opposite directions so that these forces will compensate each other (as far as the actuation is concerned). Hence, such a tensioner could definitely be arranged in the pressure chamber of the tensioning piston; pressure fluctuations of the pressure in the pressure chamber will not have any influence on the operation of the locking piston, neither into the arresting position nor into the release position. In hitherto used devices comprising controlled locking devices, such pressure fluctuations have always prevented the locking piston from moving immediately to its arresting position, when e.g. the engine hydraulic system had been switched off. The locking effect only occurred when the pressure had been reduced to a certain extent by leakage at the locking area of the locking piston. Such a delay is prevented by the structural design chosen.

In accordance with an advantageous embodiment, the locking area can be provided in the form of a locking opening in a locking plunger which extends away from the operating section, at least a portion of the locking means of the tensioning piston extending through the locking opening. The locking opening guarantees that a pressure medium in its interior will produce force components over the whole area of the opening and that the forces will compensate each other in such a way that the actuation of the locking piston will not be supported. This is a simple structural measure by means of which the locking area can be designated such that is not subjected to the influence of pressure forces.

In addition, the locking opening may be provided with a locking projection, which is arranged on the inner surface of the locking opening on one side thereof and which is used for engagement with the locking means of the tensioning piston. Such a locking projection on the inner side does not have any influence on the force conditions in the operating direction of the locking piston and guarantees nevertheless a reliable engagement with the locking means of the tensioning piston.

According to one variant, the locking means of the tensioning piston may comprise a lock-ing rod provided with teeth and extending through the locking opening of the locking piston. The operating paths of the tensioning piston and of the locking piston will therefore cross and individual components of the two pistons will interengage. A very compact and very robust structural design is provided in this way.

The locking rod can have a circular basic cross-section, the locking opening in the locking plunger being then implemented as an elongated hole which is adapted to this basic cross-section. This length (seen in the direction of the longitudinal axis of the locking piston) of the elongated hole can then correspond to at least to the operating stroke of the locking piston between the release position and the arresting position. This means that the locking rod and the locking piston part providing the locking opening can also mutually guide themselves, since the amount of play must be chosen precisely such that the locking rod can be dis-placed freely in the elongated hole in the release position. In the case of such a variant, the locking rod can also be implemented as an extension of the actual tensioning piston having a smaller diameter. However, also other cross-sections are possible instead of the circular cross-section.

When, in accordance with one variant, the inner surface of the locking opening is provided on one side thereof with an undercut portion which merges with the locking projection, the locking opening provides also in the arresting position a contact shoulder for close contact with the locking rod. When the locking piston is implemented as a plastic component or as a cast member, this undercut portion will also reduce the accumulation of material.

In accordance with one embodiment, the tensioning piston is guided in a housing, a pressure chamber is formed between the housing and the tensioning piston, the locking means extend from the inner to the outer side of the pressure chamber, and the teeth are located outside of the pressure chamber in the fully retracted position of the tensioning piston. This is to be regarded as an additional measure for displacing the locking area of the locking piston away from the pressure area of a fluid-operated tensioning piston. Depending on the structural design of the housing, the locking area will then only be subjected to a leakage flow of the fluid. Oscillating conditions occurring in the pressure medium during operation of the tensioning means will therefore not affect the locking piston.

According to a preferred embodiment, the locking piston can be guided in a housing such that it is separated from a pressure chamber of the tensioning piston. The two pistons can also be arranged in a common housing; in this case, only the locking means and the locking area cross each other and are adapted to be brought into engagement with one another.

According to a further embodiment of the tensioner for an internal combustion engine hav-ing an engine oil circuit, the piston area of the locking piston can be acted upon by the hy-draulic pressure of the engine oil circuit. By selecting an advantageous supply means, it can here be guaranteed that hydraulic oscillations of the type occurring in the area of the pres-sure chamber of the tensioning piston are decoupled as far as possible from the operation of the locking piston. In the simplest case, this delimitation is effected via a non-return valve.

BRIEF DESCRIPTION OF THE DRAWINGS

In the following, an embodiment of the present invention will be explained in detail making reference to a drawing, in which.

DETAILED DESCRIPTION OF THE INVENTION

Figures 1, 2:
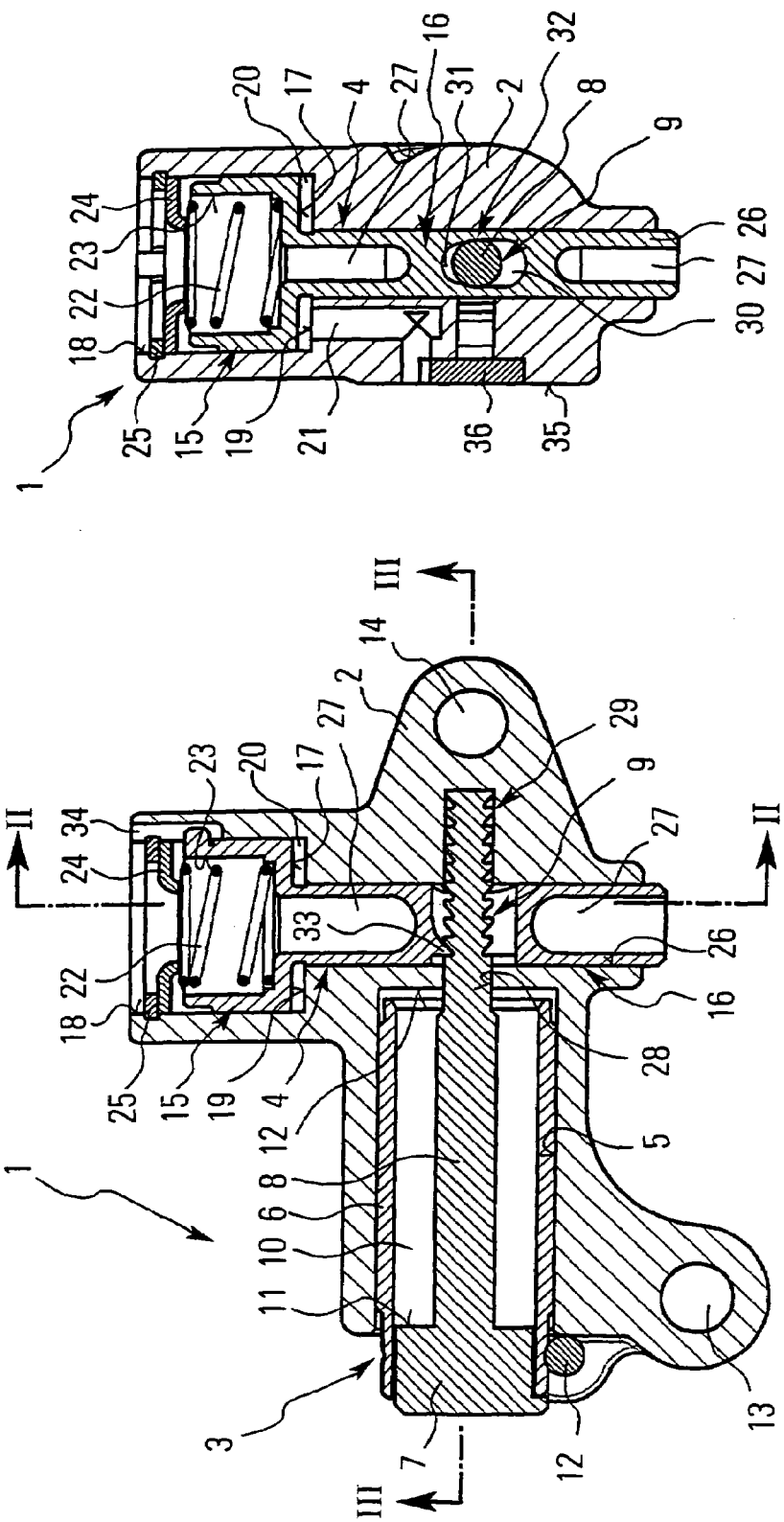
FIG. 1 shows a hydraulic chain tensioner according to the present invention in a fully sec-tional view.
FIG. 2 shows the chain tensioner of FIG. 1 in a sectional view along line II—II and FIG. 3 shows the chain tensioner of FIG. 1 in a sectional view along line II—II.
Figure 3:
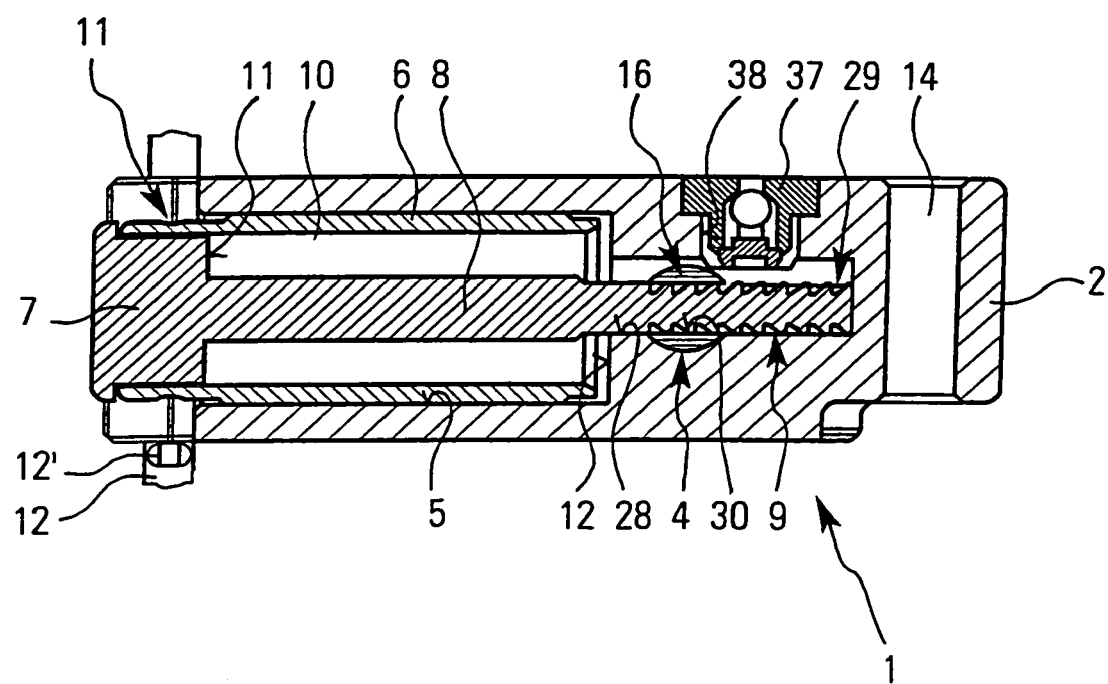

The chain tensioner 1 shown in FIG. 1 to 3 is provided with a locking function, in particular when the hydraulic circuit is switched off.

The chain tensioner 1 essentially comprises a cast housing 2 which consists e.g. of an aluminium die casting, a tensioning piston 3 which is axially guided in the housing 2, and a locking piston 4 which is guided in the housing 2 at right angles to the tensioning piston 3. The tensioning piston 3 is guided in a cylindrical bore 5 in the housing 2 and comprises a cylindrical guide sleeve 6 and a piston head 7 press-fitted into the guide sleeve 6 and consisting e.g. of a suitable plastic material. The guide sleeve 6 is preferably produced from steel. A portion of the piston head 7 rests on the end face of the guide sleeve 6 so that it is guaranteed that an endless driving element, e.g. a chain, or the tensioning area of a tensioning rail will come into contact only with the piston head 7. In the interior of the guide sleeve 6, the piston head 7 merges with a cylindrical locking rod 8 having, at the free end thereof, locking teeth 9 acting as locking means. The locking teeth are implemented as a circumferentially extending annular groove having a triangular cross-section, so that a sawtooth profile is formed in cross-section. The direction of the sawtooth profile is chosen such that an extension, but not a retraction, of the tensioning piston 3 can be blocked. Between the piston head 7 and the locking rod 8 a hollow-cylindrical annular space 10 is provided in the middle area of the locking rod 8, said annular space having arranged therein a helical compression spring (not shown). The compression spring rests on the back 11 of the piston head 7 and on the base 12 of the bore 5.

The chain tensioner 1 is shown at a position of transport. At this position, the tensioning piston 3 is fully retracted and arrested by a securing pin 12. The compression spring, not shown, in the annular space 10 is compressed in its maximum tensioning condition. When the chain tensioner 1 has been installed with the aid of the fastening sleeves 13 and 14 on the housing 2, the securing pin 12 is removed, whereby the transport position will be re-leased. The tensioning piston 3 is then in tensioning contact with e.g. the contact area of a tensioning rail, which, in turn, is pressed against a chain.

From the sectional view of FIG. 3 it can be seen that the annular space 10 and the free space of the bore 5 extending below the tensioning piston 3 can communicate via a hydrau-lic channel 37 in the housing 2 with the engine oil hydraulic system of an internal combustion engine to which the chain tensioner 1 is secured. This means that engine oil can flow into this pressure chamber via a non-return valve 36. The hydraulic fluid flows into the hy-draulic channel 37 via the non-return valve 36 which is press-fitted into a lateral bore 38 of the housing. This hydraulic channel extends parallel to the locking teeth 9 and parallel to the bore 29 in the bottom. Also a locking plunger 16 extends in this hydraulic channel 37 so that both the locking plunger 16 and the locking teeth 9 on the locking rod 8 are subjected to the hydraulic pressure. Due to the displaced section along line II—II, the non-return valve 36 is shown in FIG. 2 in a view which is only a fragmentary sectional view. In the operating state, the tensioning function is primarily applied by this hydraulic pressure whose force exceeds the tensioning force of the spring. The hydraulic fluid in the pressure chamber is therefore subjected to the vibrations of the tensioning piston 3 and relief only takes place via leakage flows. When the engine oil hydraulic pressure increases, the tensioning force of the tensioning piston 3 will increase as well.

The locking piston 4, which is displaceable in the housing 2 at right angles to the tensioning piston 3, comprises a cylindrical operating section 15 and a locking plunger 16 arranged on said operating section 15. Only the locking plunger 16 crosses the locking rod 8 of the tensioning piston 3. The operating section 15 is provided with an annular piston area 17. In addition, said operating section 15 is guided in a cylindrical bore 18 such that it is axially displaceable therein. Between the piston area 17 and the base area 19 of the operating section a pressure chamber 20 is defined, which communicates via a supply passage 21 with the engine oil hydraulic system. It follows that, when pressure is built up in the pressure chamber 20, this will have the effect that the locking piston 4 is displaced upwards (cf. FIG. 1) to a release position. In the unloaded condition, the locking piston 4 is pressed down-wards into an arresting position (cf. FIG. 1) via a compression spring 22 which is arranged in a cylindrical bore 23 of the operating section 15 and which rests on a support disk 24 se-cured by a retainer ring 25, said cylindrical bore 23 being open at the rear. The spring force is dimensioned such that, in the operating state, it will be bridged by the pressure in the pressure chamber 20.

The locking plunger 16 is rectangular in cross-section and extends in a guide opening 26 through the housing 2 and projects beyond the housing on one side thereof. In addition, the locking plunger 16 is provided with hollow spaces 27, which permit the locking plunger 16 to be also implemented as an injection-molded part consisting of plastic materials (so as to avoid accumulations of material).

The bore 5 for the tensioning piston 3 and the guide bore 26 for the locking plunger 16 communicate only via a small connection opening 28, which is just large enough to permit passage of the portion of the locking rod 8 provided with the locking teeth 9, and the hydraulic channel 37. The free end of the locking teeth 9 is received in and displaceably guided in the bore 29 in the bottom of the housing 2.

The locking teeth 9 of the locking rod 8 extend through a locking opening 30 provided in the locking plunger 16. This locking opening 30 extends at right angles to the operating direc-tion of the locking piston 4. The inner circumference of the locking opening is fully defined by the locking plunger 16 so that said locking opening can only be engaged from the left or from the right (cf. FIG. 1). In addition, when seen in a cross-sectional view, the locking open-ing 30 is implemented as an elongated hole, which is adapted to the cross-sectional shape of the locking teeth 9 of the locking rod 8. The length of said elongate hole is chosen such that it exceeds the length of the operating path of the locking piston 4. The locking opening is provided on one side thereof with an undercut portion 31 whose cross-section is, how-ever, designed such that, at the arresting position, the locking teeth 9 of the locking rod 8 will come into contact with a shoulder 32 of the locking opening so that the undercut portion 31 will remain free. On one side of the locking opening 30, a locking projection 33 projects partly into said undercut portion 31 and partly into said locking opening 30. The end face of said locking projection 33 has an arcuate form so that it will precisely fit in between the lock-ing teeth 9. The locking projection 33 is designed such that it is adapted to be brought into engagement with a respective annular groove between the teeth of the locking teeth 9. Also said annular groove is triangular in cross-section, the part of said groove merging with the undercut portion 31 being, however, rounded.

At the side of the bore 18, a vent channel 34 is arranged through which also a leakage flow can escape from the pressure chamber 20.

In the following, the mode of operation and the function of the chain tensioner 1 will be ex-plained in detail.

The locking teeth 9 of the locking rod 8 extend through a locking opening 30 provided in the locking plunger 16. This locking opening 30 extends at right angles to the operating direction of the locking piston 4. The inner circumference of the locking opening 30 is fully defined by the locking plunger 16 so that the locking opening can only be engaged from the left or from the right (cf. FIG. 1). In addition, when seen in a cross-sectional view, the locking opening 30 is implemented as an elongated hole, which is adapted to the cross-sectional shape of the locking teeth 9 of the locking rod 8. The length of the elongate hole is chosen such that it exceeds the length of the operating path of the locking piston 4. The locking opening is provided on one side thereof with an undercut portion 31 whose cross-section is, however, designed such that, at the arresting position, the locking teeth 9 of the locking rod 8 will come into contact with a shoulder 32 of the locking opening so that the undercut portion 31 will remain free. On one side of the locking opening 30, a locking projection 33 projects partly into the undercut portion 31 and partly into the locking opening 30. The end face of the locking projection 33 has an arcuate form so that it will precisely fit in between the locking teeth 9. The locking projection 33 is designed such that it is adapted to be brought into engagement with a respective annular groove between the teeth of the locking teeth 9. Also the annular groove is triangular in cross-section, the part of said groove merging with the undercut portion 31 being, however, rounded.

Assuming now that the internal combustion engine is switched off, the tensioning piston 3 and the locking piston 4 will not have applied thereto any hydraulic pressure. In this condition, the tensioning piston 3 is prevented from retracting by the locking piston 4, which is forced into the arresting position by the compression spring 22. This means that, when the engine is being started, a retraction of the tensioning piston 3 will be prevented in spite of strong forces occurring at the piston head 7, before a suitable hydraulic pressure can build up in the hydraulic circuit. It follows that, in spite of the insufficient hydraulic pressure, a predetermined tension will always be given when the engine is started. As soon as a sufficient hydraulic pressure has built up after the start of the engine, the locking piston 4 will be displaced to the release position due to the pressure that builds up in the pressure chamber 20. Also the hydraulic pressure in the pressure chamber of the tensioning piston 3 is increased such that the tensioning force will be applied mainly through this hydraulic pressure. This hydraulic pressure is load-dependent and increases in the case of higher speeds, whereby the tension will be increased. In this condition, the tensioning piston 3 can operate in the normal way, as in the case of conventional hydraulic chain tension-ers. The locking teeth 9 can move freely within the locking opening 30 because the locking projection 33 is retracted. Also hydraulic fluid penetrates into the locking opening 30 through the connection channel 37 and the connection opening 28. Due to the fact that the locking opening 30 is implemented as a circumferentially closed elongated hole, the hydraulic pressure will, however, not influence the operation of the locking piston 4. On the contrary, force components will be generated both towards the release position and towards the arresting position so that the hydraulic pressure will not influence the operating behavior of the locking piston 4 within the locking opening 30. Nor do the undercut portion 31 and the locking projection 33 produce any effect in the operating direction, since what matters is the area projected perpendicularly to the operating direction. It follows that the operation of the locking piston 4 is only influenced by the compression spring 22 and the hydraulic pressure in the pressure chamber 20. The pressure chamber 20 is, however, decoupled from the pressure chamber of the tensioning piston 3 and its pressure fluctuations caused by vibrations on the endless driving element, e.g. the chain. A reliable extension and retraction behavior of the locking piston 4 is achieved in this way.

According to a further embodiment, the locking piston could also be operated electrically or pneumatically.

The invention claimed is:

1. A tensioner (1) for endless driving elements, comprising:
   a tensioning piston (3) provided with locking means (8, 9); and
   a locking piston (4) which is adapted to move between an arresting position engaged with said locking means (8, 9) to arrest the movement of said tensioning piston (3) and a release position disengaged from said locking means (8, 9) to release the movement of said tensioning piston (3),
   the locking piston (4) having an operating section (15) causing the locking piston (4) to move to the arresting position and to the release position, and a locking area (30, 33) used for engagement with the locking means (8, 9) of the tensioning piston (3) and arranged separately from the operating section (15),
   the locking area (30, 33) of the locking piston (4) being designed such that a hydraulic force balance is caused wherein the locking area is provided in the form of a locking opening (30) in a locking plunger (16) which extends away from the operating section (15), and at least a portion of the locking means (8, 9) of the tensioning piston (3) extending through the locking opening (30).

2. A tensioner (1) according to claim 1, wherein the operating section (15) of the locking piston (4) is provided with a piston area (17) which is adapted to have applied thereto an operating pressure of a hydraulic fluid, the operating direction of the piston area (17) being directed towards the release position of the locking piston (4).

3. A tensioner (1) according to claim 1, further comprising a spring means (22), which acts on the operating section (15) of the locking piston (4), the spring means (22) being effective in the direction of the arresting position of the locking piston (4).

4. A tensioner (1) according to claim 1, wherein the locking opening (30) is provided with a locking projection (33), which is arranged on the inner surface of the locking opening (30) on one side thereof and which is used for engagement with the locking means (8, 9) of the tensioning piston (3).

5. A tensioner (1) according to claim 1, wherein the locking means (8, 9) of the tensioning piston (3) comprises a locking rod (8) provided with teeth (9) and extending through the locking opening (30) of the locking piston (4).

6. A tensioner (1) according to claim 5, wherein the locking rod (8) has a circular basic cross-section, and the locking opening (30) is implemented as an elongated hole which is adapted to the basic cross-section, the length of the elongated hole corresponding at least to the operating stroke of the locking piston (4) between the release position and the arresting position.

7. A tensioner (1) according to claim 6, wherein the inner surface of the locking opening (30) is provided on one side thereof with an undercut portion (31) which merges with the locking projection (33).

8. A tensioner (1) according to claim 5, wherein the tensioning piston (3) is guided in a housing (2), a pressure chamber is formed between the housing (2) and the tensioning piston (3), the locking means (8, 9) extends from the inner to the outer side of the pressure chamber, and the teeth (9) are located outside of the pressure chamber, at least in the fully retracted position of the tensioning piston (3).

9. A tensioner (1) according to claim 1, wherein the locking piston (4) is guided in a housing (2) such that it is separated from a pressure chamber of the tensioning piston (3).

* * * * *

UNITED STATES PATENT AND TRADEMARK OFFICE
CERTIFICATE OF CORRECTION

PATENT NO. : 7,186,195 B2
APPLICATION NO. : 10/450725
DATED : March 6, 2007
INVENTOR(S) : Wolfram Hellmich et al.

Page 1 of 1

It is certified that error appears in the above-identified patent and that said Letters Patent is hereby corrected as shown below:

On the Title Page:

Item (75) Inventors, the correct spelling of Inventor's location in Germany is "Füstenfeldbruck".

Item (73) Assignee, the Assignee information, "Joh. Winklhofer & Sohne GmbH und. Co. KG" should be --Joh. Winklhofer & Söhne GmbH und Co. KG--

Signed and Sealed this

Twelfth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,186,195 B2
APPLICATION NO. : 10/450725
DATED : March 6, 2007
INVENTOR(S) : Wolfram Hellmich et al.

It is certified that error appears in the above-identified patent and that said Letters Patent is hereby corrected as shown below:

On the Title Page:

At field (30), "201 19 200" should be -- 201 19 200.4 --.

At field (57), line 5, "of tensioning" should be -- of the tensioning --.

In the Claims:

At Column 7, line 43, "caused wherein" should be -- caused, wherein --.

Signed and Sealed this

Twenty-seventh Day of May, 2008

JON W. DUDAS
*Director of the United States Patent and Trademark Office*